(12) United States Patent
Ikeda et al.

(10) Patent No.: US 7,532,432 B2
(45) Date of Patent: May 12, 2009

(54) PERPENDICULAR MAGNETIC RECORDING SYSTEM WITH MEDIUM HAVING THIN SOFT UNDERLAYER AND RECORDING HEAD HAVING THICK-THROAT TRAILING SHIELD

(75) Inventors: Yoshihiro Ikeda, San Jose, CA (US); Byron Hassberg Lengsfield, III, Gilroy, CA (US); James Terrence Olson, Santa Cruz, CA (US); Petrus Antonius VanDerHeijden, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 584 days.

(21) Appl. No.: 11/379,858

(22) Filed: Apr. 24, 2006

(65) Prior Publication Data

US 2007/0247748 A1 Oct. 25, 2007

(51) Int. Cl.
*G11B 5/127* (2006.01)
*G11B 5/23* (2006.01)

(52) U.S. Cl. ............................ 360/125.02; 360/119.02; 360/125.3

(58) Field of Classification Search . 360/125.02–125.3, 360/123.12, 119.02–119.04
See application file for complete search history.

(56) References Cited

U.S. PATENT DOCUMENTS

| | | | |
|---|---|---|---|
| 6,686,070 B1 | 2/2004 | Futamoto et al. | |
| 6,798,615 B1 * | 9/2004 | Litvinov et al. | 360/125.17 |
| 6,835,475 B2 | 12/2004 | Carey et al. | |
| 7,009,812 B2 | 3/2006 | Hsu et al. | |
| 7,196,871 B2 * | 3/2007 | Hsu et al. | 360/125.03 |
| 2005/0024766 A1 * | 2/2005 | Khera et al. | 360/125 |
| 2007/0211377 A1 * | 9/2007 | Sasaki et al. | 360/126 |
| 2007/0291410 A1 * | 12/2007 | Oka | 360/126 |

* cited by examiner

*Primary Examiner*—A. J. Heinz
(74) *Attorney, Agent, or Firm*—Thomas R. Berthold

(57) ABSTRACT

A perpendicular magnetic recording data storage system combines a perpendicular medium that has a thin low-magnetic-permeability or "soft" underlayer (SUL) with a recording head that has a trailing shield (TS) with a thick throat height, i.e., a thickness in a direction orthogonal to the recording layer of the medium. The SUL is thin enough and has a low enough magnetic permeability to become saturated in a region beneath the trailing gap of the head during writing, but the throat height of the TS is thick enough to prevent the TS from becoming magnetically saturated during writing. The magnetic saturation of the SUL during writing changes the magnetic reluctance such that more of the magnetic flux going through the SUL changes direction ("field undershoot") and goes to the TS. If the permeability of the SUL is so low (e.g., close to unity) that the SUL does not magnetically saturate, field undershoot may still occur because the reluctance from the SUL to the TS is still smaller than the reluctance from the SUL to the return pole (RP). Field undershoot enables a high write field gradient, which results in narrower magnetic transitions.

21 Claims, 7 Drawing Sheets

PERPENDICULAR MAGNETIC RECORDING SYSTEM WITH MEDIUM HAVING THIN SOFT UNDERLAYER AND RECORDING HEAD HAVING THICK-THROAT TRAILING SHIELD

BACKGROUND OF THE INVENTION

1. Field of the Invention

This invention relates generally to perpendicular magnetic recording data storage systems, and more particularly to a system that uses a medium with a recording layer formed over a "soft" or relatively low-coercivity magnetically permeable underlayer, and a recording head with a single write pole and a trailing shield.

2. Description of the Related Art

Perpendicular magnetic recording, wherein the recorded bits are stored in a perpendicular or out-of-plane orientation in the recording layer, is a promising path toward ultra-high recording densities in data storage systems, such as hard disk drives (HDDs). One type of system uses a recording head with a single write pole (WP) and a "dual-layer" recording disk with the perpendicular magnetic data recording layer (RL) formed over a "soft" or relatively low-coercivity magnetically permeable underlayer (SUL). The SUL serves as a return path for magnetic flux from the WP back to the recording head's return pole (RP). However, this type of system also results in the write field inside the RL being oriented nearly normal to the surface of the RL, i.e., along the perpendicular easy axis of magnetization of the RL. This nearly parallel alignment of the write field with the RL easy axis has the disadvantage that relatively high write fields are necessary to reverse the magnetization in the RL. To address this problem, the recording head may have a trailing shield (TS) of magnetically permeable material spaced down-track from the WP and separated from the WP by a trailing gap of nonmagnetic material. The TS slightly alters the angle of the write field and makes writing easier.

It can be difficult and costly to manufacture large numbers of these types of perpendicular magnetic recording HDDs. The disk requires a relatively thick SUL to avoid magnetic saturation, which requires additional material and increases the manufacturing time and cost. Also, to increase the disk data storage density the width of the WP will need to decrease to decrease the width of the data tracks. This will require a recording head with a relatively thin TS with tight tolerances to increase the write field, which makes high-yield manufacturing difficult.

What is needed is a perpendicular magnetic recording system that is less difficult and costly to manufacture in large numbers, but still uses a recording head with a TS to improve the writing process.

SUMMARY OF THE INVENTION

The perpendicular magnetic recording data storage system of this invention combines a perpendicular medium that has a thin low-magnetic-permeability SUL with a recording head that has a TS with a thick throat height, i.e., a thickness in a direction orthogonal to the recording layer. The SUL is thin enough and has a low enough magnetic permeability to become saturated in a region beneath the trailing gap of the head during writing, but the throat height of the TS is thick enough to prevent the TS from becoming magnetically saturated during writing. The TS may be magnetically connected to the yoke or the RP, or it may be "floating", i.e., not magnetically connected to either the yoke or the RP. The SUL has a magnetic permeability less than about 25 and a thickness less than about 50 nm. The TS has a magnetic permeability greater than about 100 and a throat height greater than about 40 nm. During writing, a small region at the top of the SUL beneath the trailing gap becomes magnetically saturated, which changes the magnetic reluctance such that more of the magnetic flux going through the SUL changes direction ("field undershoot") and goes to the TS. If the permeability of the SUL is so low (e.g., close to unity) that the SUL does not magnetically saturate, field undershoot will still occur because the reluctance from the SUL to the TS is still smaller than the reluctance from the SUL to the RP. Field undershoot enables a high write field gradient, which results in narrower magnetic transitions. Narrower magnetic transitions reduce the media "jitter" noise, enabling a higher linear data recording density.

For a fuller understanding of the nature and advantages of the present invention, reference should be made to the following detailed description taken together with the accompanying figures.

DETAILED DESCRIPTION OF THE INVENTION

Figure 1A:
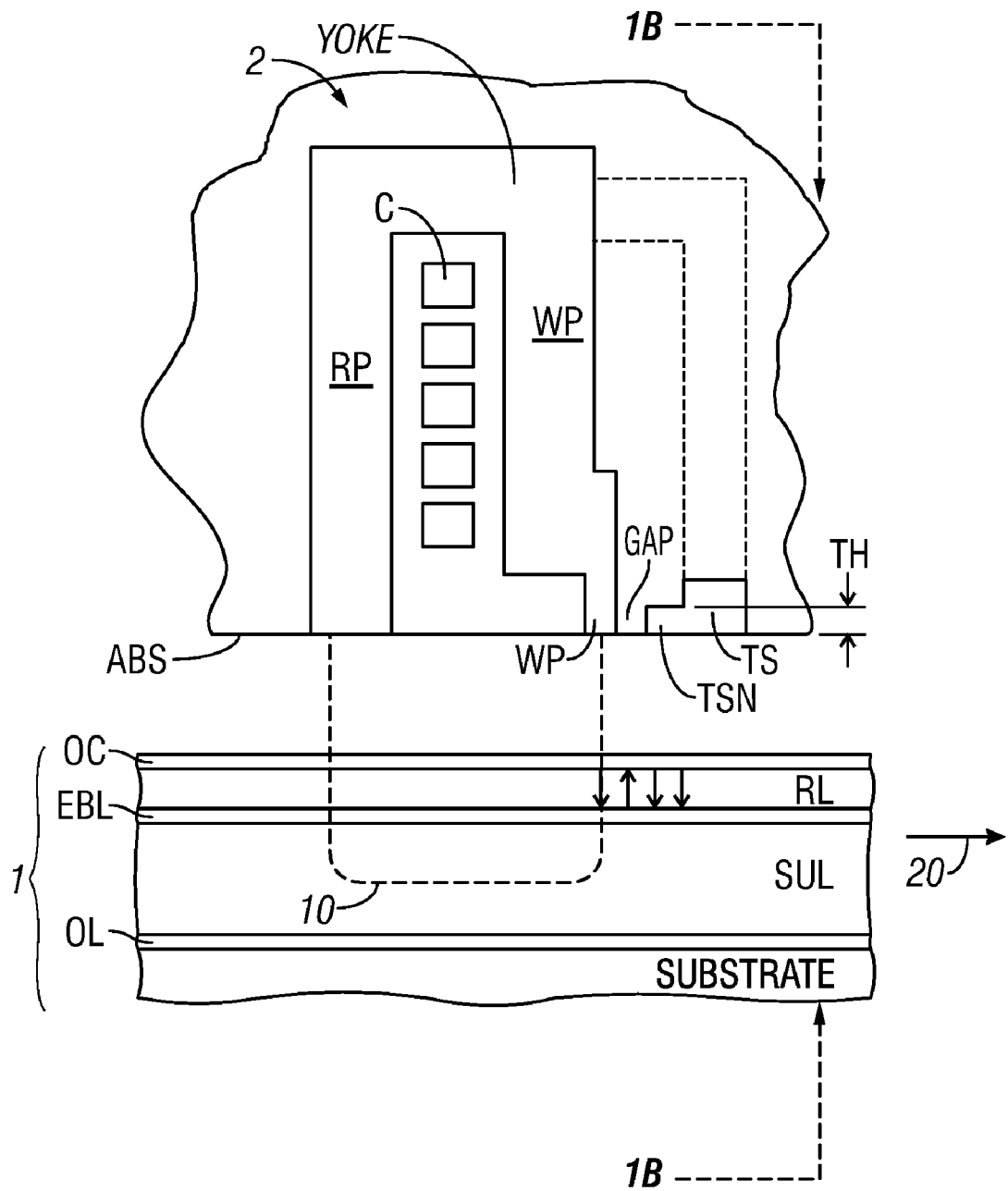
FIG. 1A is a schematic of a prior art perpendicular magnetic recording system.

FIG. 1A illustrates a hard disk drive (HDD) implementation of a perpendicular magnetic recording data storage system according to the prior art. A "dual-layer" recording disk 1 includes a perpendicular magnetic data recording layer (RL) over a "soft" or relatively low-coercivity magnetically permeable underlayer (SUL). The disk 1 also includes the hard disk substrate, a seed or onset layer (OL) for growth of the SUL, an exchange break layer (EBL) to break the magnetic exchange coupling between the magnetically permeable films of the SUL and the RL and to facilitate epitaxial growth of the RL, and a protective overcoat (OC).

The hard disk substrate may be any commercially available glass substrate, but may also be a conventional aluminum alloy with a NiP surface coating, or an alternative substrate, such as silicon, canasite or silicon-carbide. The adhesion layer or OL for the growth of the SUL may be an AlTi alloy or a similar material with a typical thickness of about 2-5 nanometers (nm).

The SUL may be a single layer of magnetically permeable material, as shown in FIG. 1A. The SUL may also be a laminated or multilayered antiferromagnetically-coupled (AF-coupled) SUL formed of at least two soft magnetic films separated by a nonmagnetic interlayer film, such as an interlayer film of Ru, Ir, or Cr or alloys thereof, that mediates an antiferromagnetic coupling. This type of SUL is described in U.S. Pat. Nos. 6,686,070 B1 and 6,835,475 B2. However, instead of the AF-coupled SUL, the SUL may be a non-AF-coupled laminated or multilayered SUL that is formed of multiple soft magnetic films separated by nonmagnetic films, such as films of carbon or SiN or electrically conductive films of Al or CoCr. The SUL layer or layers are formed of magnetically permeable materials such as alloys of CoNiFe, FeCoB, CoCuFe, NiFe, FeAlSi, FeTaN, FeN, FeTaC, CoTaZr, CoFeTaZr, CoFeB, and CoZrNb. In the prior art system, the SUL has a relatively high magnetic permeability and a thickness in the range of approximately 100-400 nm to assure that it does not become magnetically saturated during writing.

The EBL is located on top of the SUL. It acts to break the magnetic exchange coupling between the magnetically permeable films of the SUL and the RL and also serves to facilitate epitaxial growth of the RL. The EBL may not be necessary, but if used it can be a nonmagnetic titanium (Ti) layer; a non-electrically-conducting material such as Si, Ge and SiGe alloys; a metal such as Cr, Ru, W, Zr, Nb, Mo, V and Al; a metal alloy such as amorphous CrTi and NiP; an amorphous carbon such as $CN_x$, $CH_x$ and C; or oxides, nitrides or carbides of an element selected from the group consisting of Si, Al, Zr, Ti, and B. If an EBL is used, a seed layer (not shown) may be used on top of the SUL before deposition of the EBL. For example, if Ru is used as the EBL, a 2-4 nm thick NiFe seed layer may be deposited on top of the SUL, followed by a 5-20 nm thick Ru EBL.

The RL may be formed of any of the known amorphous or crystalline materials and structures that exhibit perpendicular magnetic anisotropy. Thus, the RL may be a layer of granular polycrystalline cobalt alloy, such as a CoPt or CoPtCr alloy, with or without an oxide, such as oxides of Si, Ta, Ti, Nb and B. The protective OC formed on the RL may be an amorphous "diamond-like" carbon film or other known protective overcoat, such as silicon nitride (SiN).

FIG. 1A shows this type of disk 1 with a recording head 2 that uses a single write pole (WP). A thin film coil (C) is shown in section between the WP and the return pole (RP) of the recording head 2. The portion above the coil in FIG. 1A that connects the WP and the return pole is referred to as the yoke. The coil may also be wrapped helically around the write pole WP. Write current through coil C induces a magnetic field (shown by dashed line 10) from the WP that passes through the RL (to magnetize the region of the RL beneath the WP), through the flux return path provided by the SUL, and back to the RP. The recording head 2 is typically formed on an air-bearing slider that has its air-bearing surface (ABS) supported above the RL of the disk 1. FIG. 1A also shows the recording head 2 having a trailing shield (TS) that is near the WP but spaced from the WP by a gap of nonmagnetic material. In the implementation shown the TS is the type that has an optional trailing shield notch (TSN) portion. The TS, or the optional TSN, has throat thickness or throat height (TH) measured in direction generally normal to the ABS. The TS may be connected to the yoke, as represented by the dashed lines between the TS and the yoke in FIG. 1A, or to the RP, such as by side connections that would extend out of the paper in FIG. 1A. The TS may also be "floating" as shown in FIG. 1A, meaning that is not magnetically connected to either the yoke or the RP. Also, the TS may be the trailing shield portion of a "wrap-around" shield that also includes two side shield portions. In a wrap-around shield the side shield portions are connected to the trailing shield portion but located on opposite sides of the WP (into and out-of the paper in FIG. 1A) and function to control the width of the write field.

As shown in FIG. 1A the RL is illustrated with perpendicularly recorded or magnetized regions along a data track, with adjacent regions having opposite magnetization directions, as represented by the arrows. The magnetic transitions between adjacent oppositely-directed magnetized regions are detectable by the read head (not shown) as the recorded bits. In FIG. 1A, the disk 1 moves past the recording head 2 in the direction indicated by arrow 20, so the TS is located down-track from the WP.

Figure 1B:
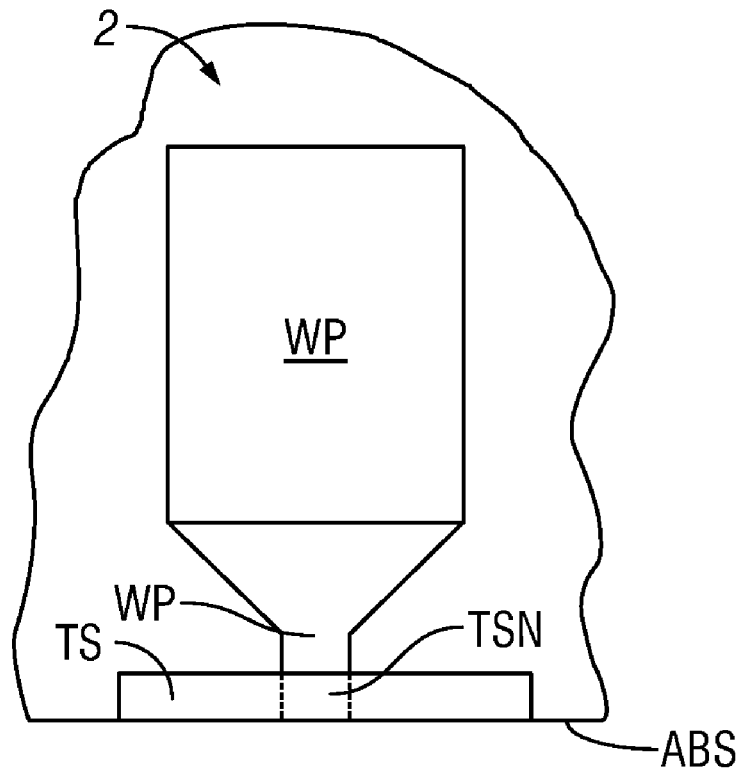
FIG. 1B is a view in the direction 1B-1B of FIG. 1A and illustrates the width of the WP to define the trackwidth (TW) of the data recorded in the RL.
Figure 1B:
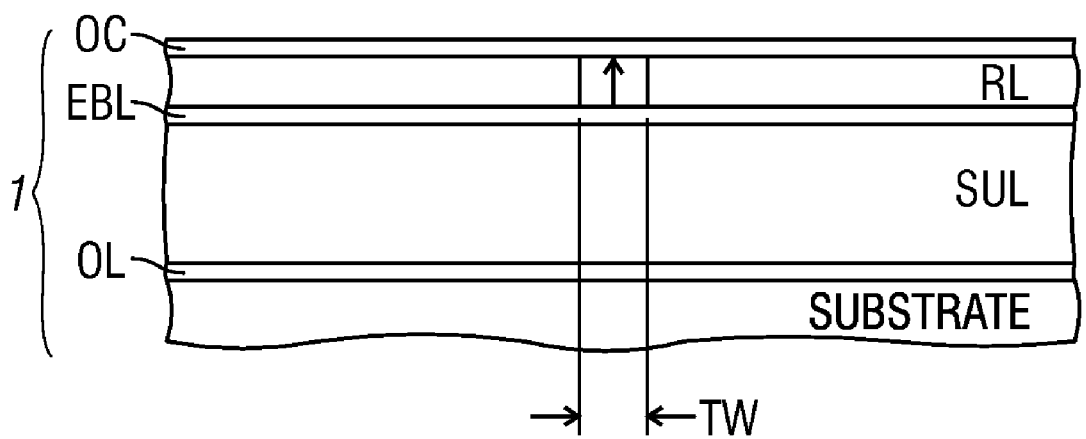
Figure 2:
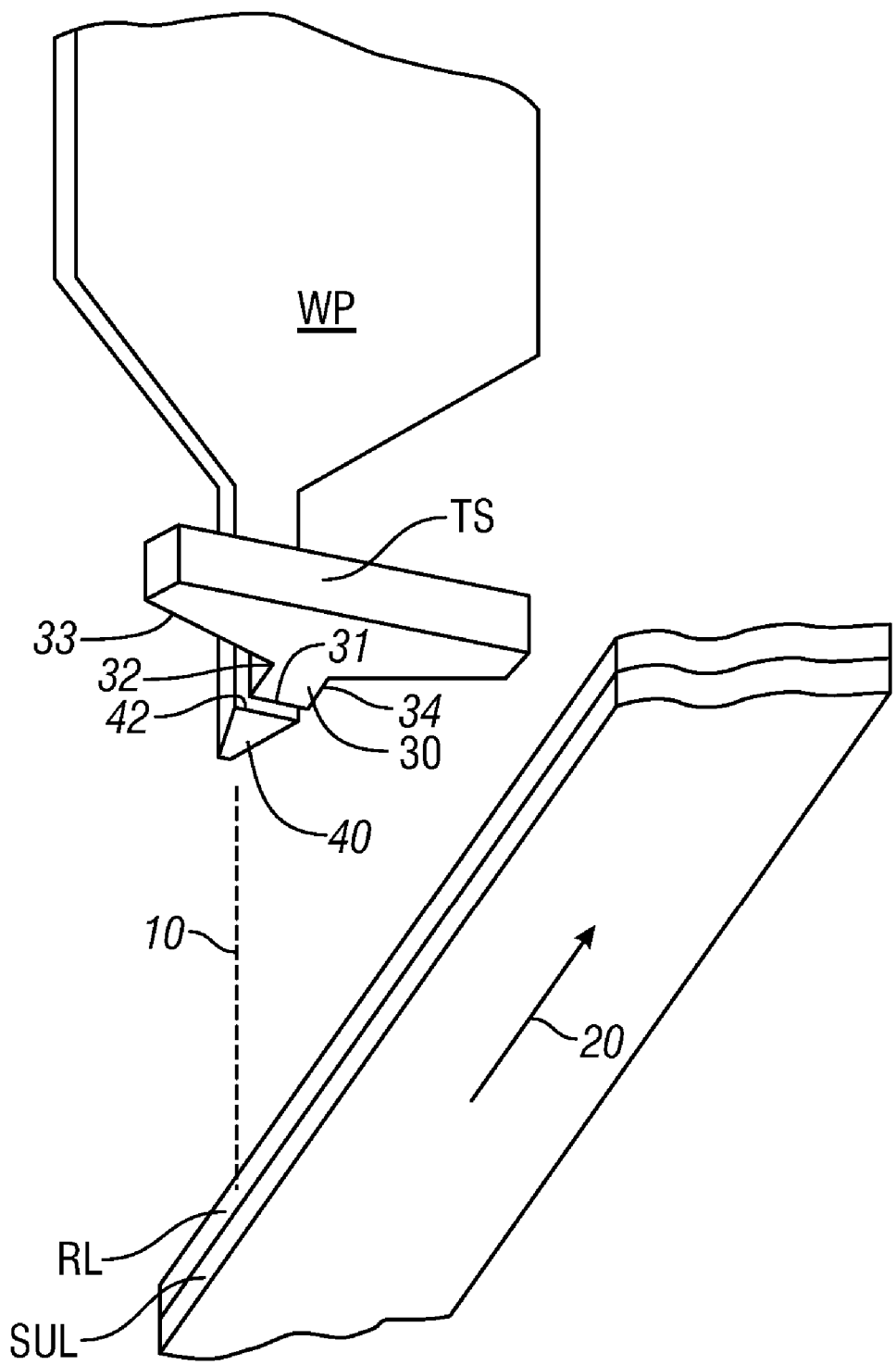
FIG. 2 is a perspective view showing the relationship between the WP, the TS with a trailing shield notch (TSN), and the recording disk with the RL for the prior art system of FIG. 1A.
Figure 3:
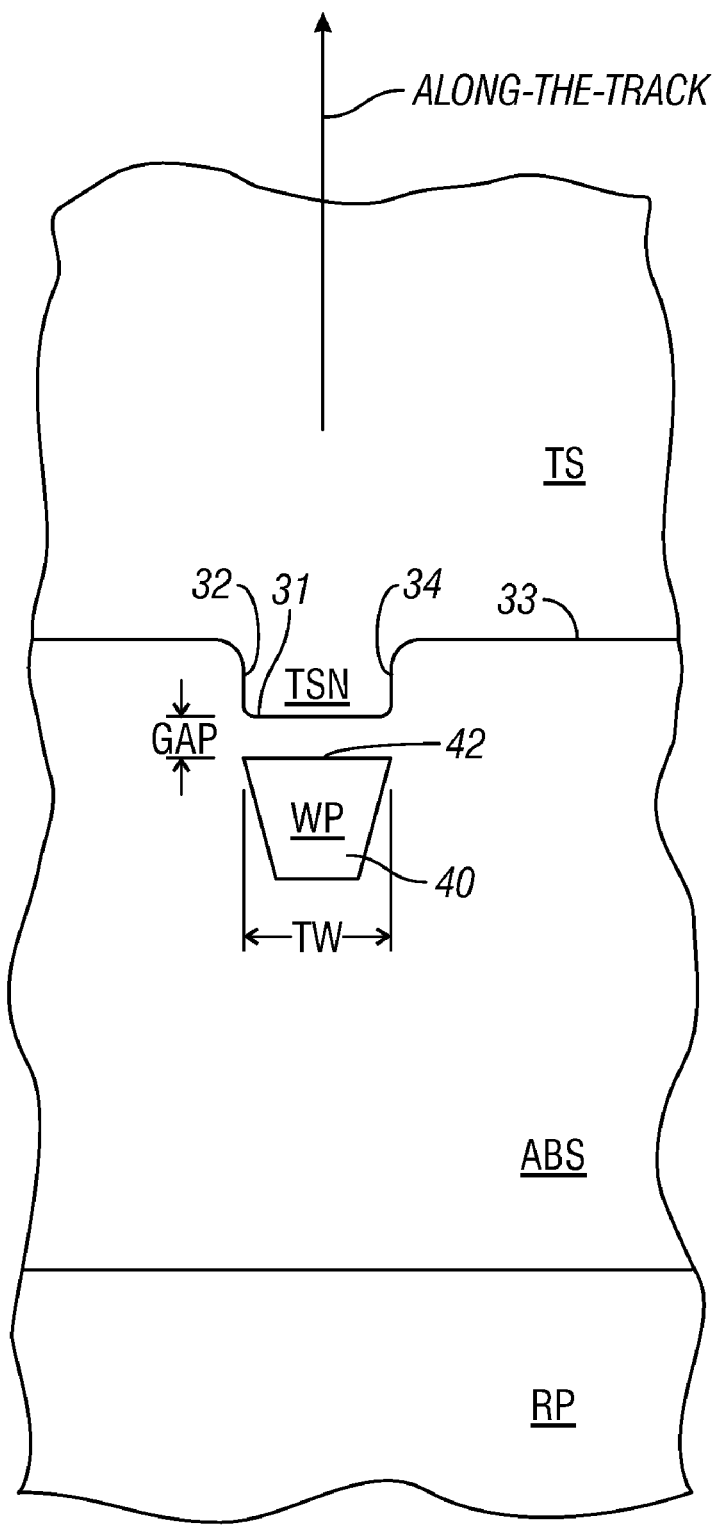
FIG. 3 is a view of the slider ABS for the prior art system of FIG. 1A, as seen from the disk, and shows portions of the write head, with details of the WP, the TSN and the gap between the WP and the TSN.

FIG. 1B is a view in the direction 1B-1B of FIG. 1A and illustrates the width of the WP to substantially define the trackwidth (TW) of the data track in the RL. The TS is substantially wider than the WP in the cross-track direction but the TSN portion is generally the same width as the WP. FIG. 2 is a perspective view showing the relationship between the WP, the TS with TSN, and a portion of the recording disk 1 with just the RL and SUL depicted. The TSN is generally rectangularly shaped with a generally planar end 30 parallel to the ABS, a front edge 31, generally parallel side edges 32, 34 and a back edge 33. The WP has a generally planar end 40 generally parallel to the ABS and a trailing edge 42 that is generally orthogonal to the along-the-track direction and generally defines the TW. FIG. 3 is a view of the slider ABS, as seen from the disk, and shows portions of the recording head 2, with details of the WP, the TSN and the gap between the WP and the TSN. The gap between the WP and the TSN is typically alumina ($Al_2O_3$) or other nonmagnetic material, such as Ta, Rh or Ir, with a thickness in the range of about 20-60 nm. The WP is typically high-moment magnetic material, such as CoFe or NiFe, and has a typical thickness in the along-the track direction of about 150-250 nm. The TW is typically in the range of about 80-150 nm. As disk areal density increases in future HDDs, the along-the-track thickness of the WP and the TW will become even smaller. The TS is a magnetic material, such as CoFe or NiFe, and the distance between the front edge 31 and back edge 33 of the optional TSN is in the range of about 20-150 nm.

Figure 4:
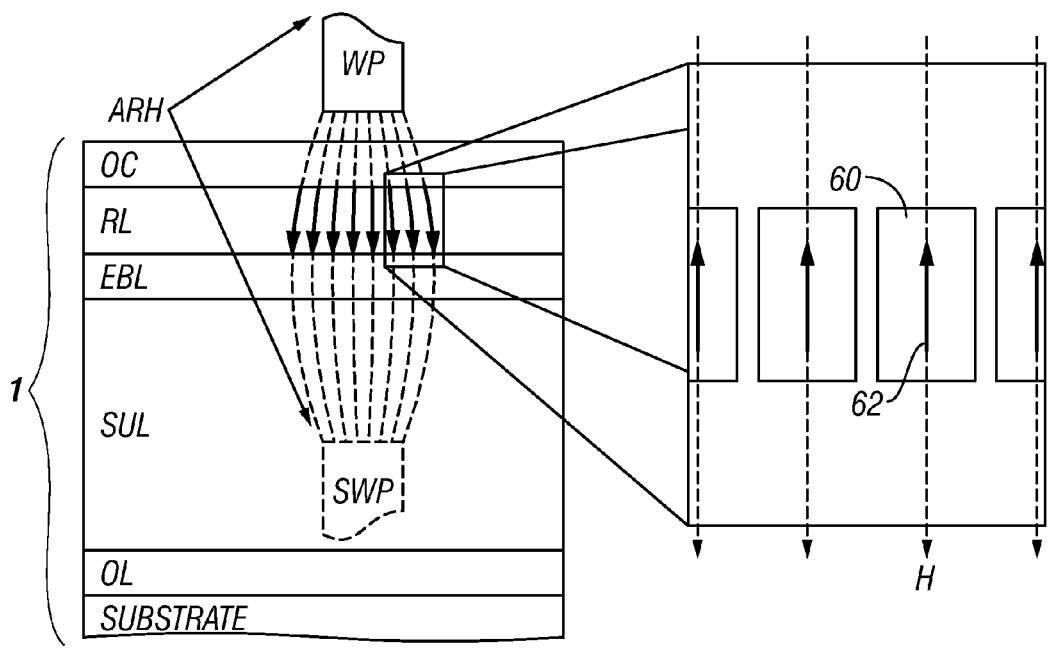
FIG. 4 is a schematic of a cross-section of a prior art perpendicular magnetic recording disk showing the write field H from the WP acting on the recording layer (RL), with an expanded view showing the generally parallel alignment of H with the easy axis of magnetization of the ferromagnetic alloy grains making up the RL.

The use of a recording head with a TS separated from the WP by a nonmagnetic gap addresses the problem of the nearly parallel alignment of the write field with the easy axis of the ferromagnetic alloy grains making up the RL. This can be understood by reference to FIG. 4, which is a schematic of a cross-section of disk 1 showing the write field H acting on the recording layer RL. The RL is located inside the gap of the "apparent" recording head (ARH), which allows for significantly higher write fields compared to longitudinal or in-plane recording. The ARH comprises the WP, which is the real write head located above the disk, and a secondary write pole "image" (SWP) beneath the RL. The SWP is facilitated by the SUL, which is decoupled from the RL by the EBL and produces a magnetic image of the WP during the write process. This effectively brings the RL into the gap of the ARH and allows for a large write field H inside the RL. However, this geometry also results in the write field H inside the RL being oriented nearly normal to the surface of the substrate and the surface of the RL, i.e., along the perpendicular easy axis of the ferromagnetic alloy grains making up the RL, as shown by typical grain 60 with easy axis 62. The nearly parallel alignment of the write field H and the RL easy axis has the disadvantage that relatively high write fields are necessary to reverse the magnetization because minimal torque is exerted onto the grain magnetization. The TS slightly alters the angle of the write field and makes writing more efficient. To increase the disk data storage density, the width of the WP will need to decrease to decrease the TW. This will require a TS with a relatively thin TH. For example, a recording head with a TS having a TH less than about 35 nm may be required for future HDDs.

The perpendicular magnetic recording data storage system of this invention combines a perpendicular medium that has a thin low-magnetic-permeability SUL with a recording head that has a TS with a thick throat height. The SUL is thin enough so that a small region at the top of the SUL beneath the trailing gap becomes saturated during writing. This changes the magnetic reluctance such that the reluctance from the SUL to the TS is smaller than the reluctance from the SUL to the RP. Thus more of the magnetic flux going through the SUL changes direction ("field undershoot") and goes to the TS. If the permeability of the SUL is so low (e.g., close to unity) that the SUL does not magnetically saturate, field undershoot will still occur because the reluctance from the SUL to the TS is still smaller than the reluctance from the SUL to the RP. The TS may be "floating" or magnetically connected to the yoke or the RP. Also, the TS may be the trailing shield portion of a wrap-around shield that also includes two side shield portions. The throat height of the TS is thick enough to prevent the TS from becoming magnetically saturated during writing.

Figure 5:
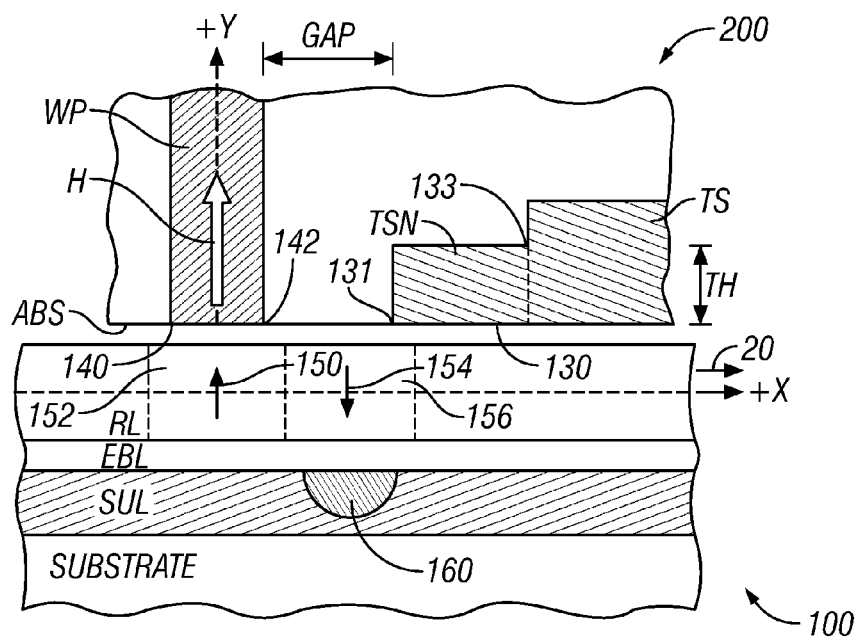
FIG. 5 is a schematic of a cross section of a portion of the recording head and disk in a perpendicular magnetic recording system according to this invention.

The perpendicular magnetic recording system of this invention is shown in the side sectional view of FIG. 5. The magnetic recording medium is depicted as disk 100 with only the substrate, SUL, EBL and RL shown for purposes of ease of explanation. The disk 100 is similar to that according to the previously-described prior art with the primary difference being that the SUL is made substantially thinner and with a magnetic permeability so that it is capable of saturation in a region beneath the trailing gap in the presence of the write field from the WP. Even if the SUL does not become saturated because its permeability is so low, field undershoot will still occur, as it would if no SUL were present. The thickness of the SUL is preferably less than about 50 nm, as compared to the prior art thickness of greater than 50 nm and more typically between about 100-400 nm.

The recording head 200 is similar to that according to the previously-described prior art with the primary difference being that the trailing shield (TS) is made with a substantially thicker throat height (TH) and with a magnetic permeability so that it does not saturate in the presence of the write field from the WP. The recording head 200 has a write pole (WP) with a generally planar end 140 and a trailing edge 142, and a trailing shield (TS) with a generally planar end 130 and a front edge 131. The WP trailing edge 142 and TS front edge 131 are separated by a gap of nonmagnetic material. The TS is depicted with an optional trailing shield notch (TSN) that has a front edge, which is front edge 131, and a back edge 133. The TSN has a throat thickness or throat height (TH) measured in a direction orthogonal to the planar end 130. The TH of the TSN (or the TN if no TSN is present) is preferably greater than about 40 nm.

In this invention preferably the SUL has a magnetic permeability less than about 25, and the TS has a magnetic permeability greater than about 100. The magnetic permeability of a material is its ability to acquire high magnetization in relatively weak magnetic fields. In magnetic recording the magnetic permeability μ is generally expressed without units as $$\mu = 1 + 4\pi(dM/dH), \quad \text{Eq. (1)}$$

where H is the external field applied to the material and is in units of Oersted (Oe), and M is the material's magnetization as a result of the external field and is in units of emu/cm$^3$.

In this invention preferably the SUL has a magnetic saturation less than about 1.5 Tesla and the TS has a magnetic saturation greater than about 1.6 Tesla. The magnetic flux density B in a material is expressed as $$B = \mu H \quad \text{Eq. (2)}$$

and the magnetic saturation $B_S$, the maximum magnetic flux density a material can absorb, occurs when an increase in H no longer produces a change in M. So at saturation, dM/dH approaches zero and μ=1.

Referring again to FIG. 5, X and Y axes are shown, with the X axis being along the data track in the RL and the Y axis being through the WP. The WP produces a write field H as depicted by the arrow along the Y axis. The write field H acts to switch the magnetization 150 in a magnetized region 152 in the RL beneath the WP. A previously written region 156 has a magnetization 154 in the opposite direction as the write field H. It is the transition of adjacent magnetizations (arrows 150, 154) that is detectable by the read head as a recorded data "bit". The vertical or Y-component of the field H varies as a function of X. In this invention, the properties of the SUL and TS cause the vertical component of H to change direction ("field undershoot") in the region of the RL beneath the TS. Field undershoot enables a high write field gradient, i.e., dH/dx, which results in narrower magnetic transitions. Narrower magnetic transitions reduce the media "jitter" noise, enabling a higher linear data recording density.

Figure 6:
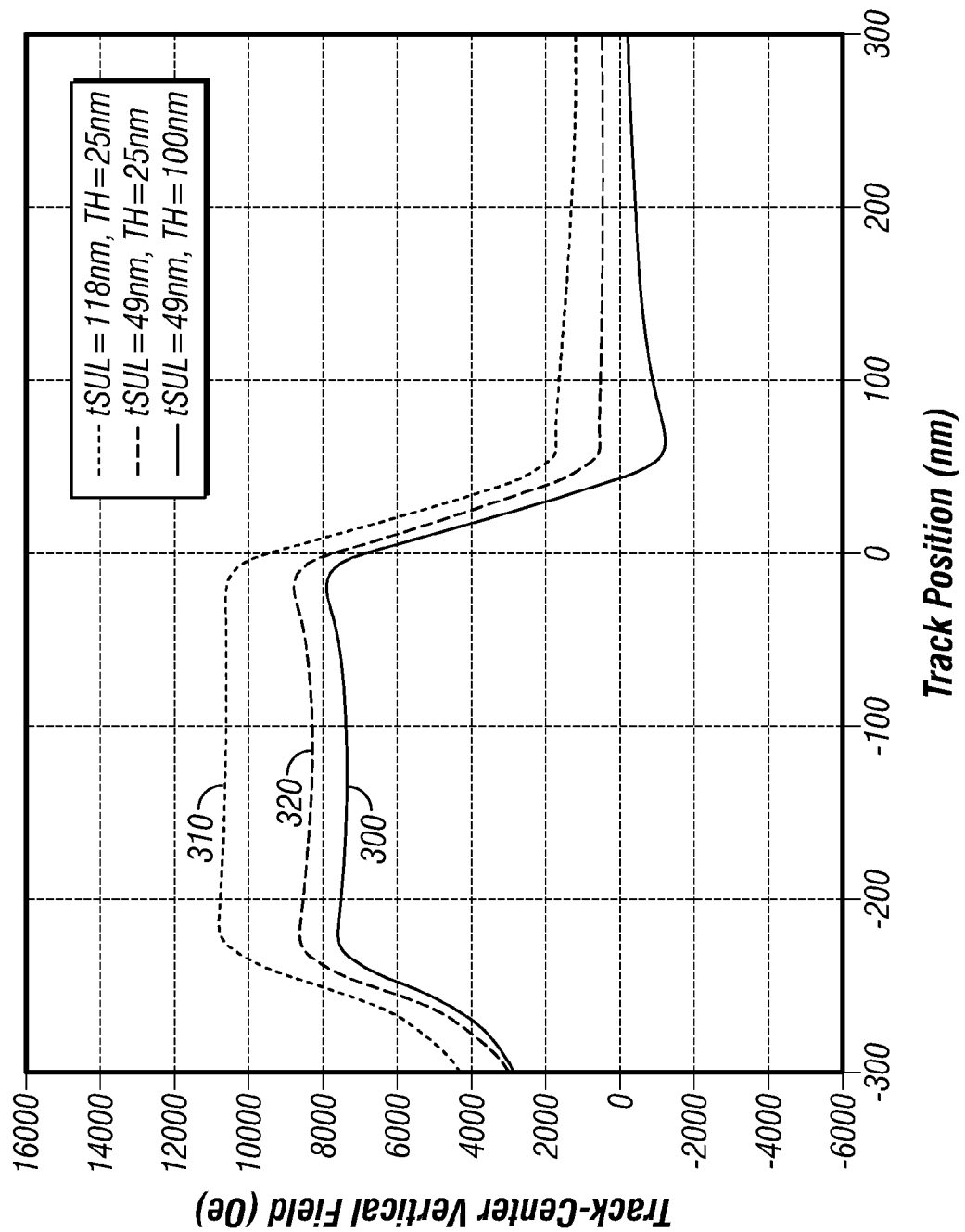
FIG. 6 is a graph of track-center vertical field (Y axis) in the RL as a function of track position (X axis) for three different systems with different values of TS throat height (TH) and SUL thickness.

FIG. 6 is a graph of track-center vertical field (Y axis) in the RL as a function of track position (X axis) for three different systems with different values of TS throat height (TH) and SUL thickness (tSUL). Curve 300 is for a system according to this invention with a thin SUL (49 nm) and thick TS (TH=100 nm), and shows field undershoot occurring at a down-track position of about 50 nm, which would be in the region of the RL adjacent to the TS, i.e., beneath the TS in FIG. 5. Curve 310 is for a system with both a thick SUL (118 nm) and thin TS (TH=25 nm), and curve 320 is for a system with a thin SUL (49 nm) but a thin TS (TH=25 nm).

Figure 7:
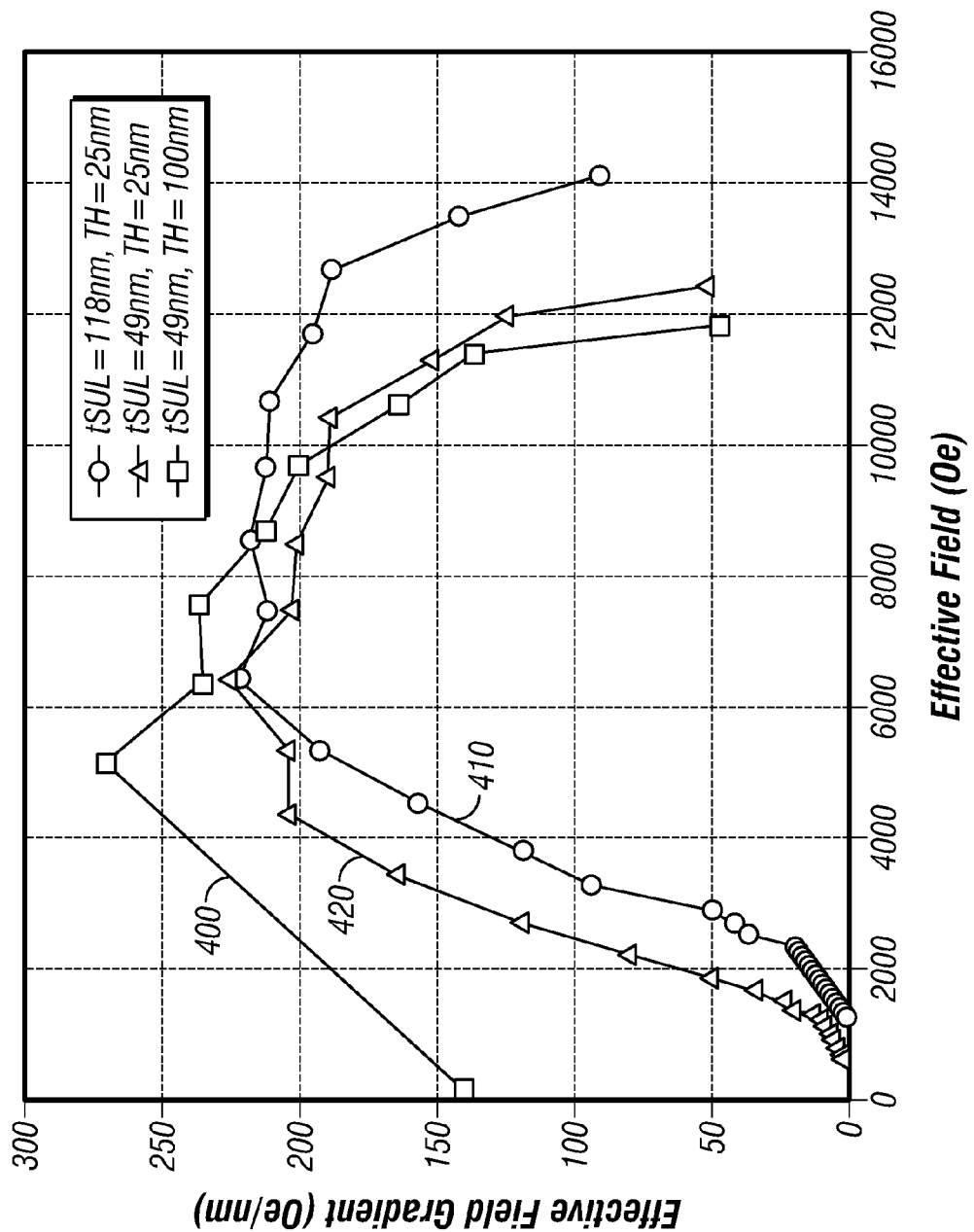
FIG. 7 is a graph of effective write field gradient as a function effective write field for three different systems with different values of TS throat height (TH) and SUL thickness.

FIG. 7 is a graph of effective write field gradient as a function effective write field for three different systems with different values of TS throat height (TH) and SUL thickness (tSUL). The effective write field is primarily the vertical or Y component of the write field, but modified to account for a change in coercivity of the RL. This is because the coercivity of the RL depends on the angle at which the write field is applied. Curve 400 is for a system according to this invention with a thin SUL (49 nm) and thick TS (TH=100 nm), and shows the highest field gradients at effective write fields in the range of interest, i.e., 4000-8000 Oe. Curve 410 is for a system with both a thick SUL (118 nm) and thin TS (TH=25 nm), and curve 420 is for a system with a thin SUL (49 nm) but a thin TS (TH=25 nm).

In this invention the reduced thickness and permeability of the SUL result in a small region at the top of the SUL beneath the trailing write gap becoming magnetically saturated, as depicted by item 160 in FIG. 5. This changes the magnetic reluctance path of the field such that more magnetic field going through the SUL changes direction ("undershoot") and goes to the leading edge of the TS. This occurs as long as the leading edge region of the TS is not magnetically saturated. It is the thicker TH of the TS which prevents magnetic saturation of the TS.

Thus in this invention the thin low-magnetic-permeability SUL "tunes" the write head such that field undershoot occurs, resulting in a high write field gradient. The SUL conducts magnetic flux from the WP to the TS as well as to the RP. Because the SUL is considered part of the recording head, the properties of the recording head can be "tuned" by altering the SUL, e.g., by reducing its magnetic permeability and/or thickness. The coercivity of the RL and the thickness of the EBL are sufficient to allow adequate writability of the RL while utilizing a near optimal write field gradient.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording data storage system comprising:
   a perpendicular magnetic recording medium comprising
      a generally planar substrate;
      an underlayer of magnetically permeable material on the substrate and having a thickness greater than zero and less than 50 nm, the underlayer being sufficiently thick to provide magnetic permeability μ to the underlayer of greater than 1 and less than 25, the underlayer having a magnetic saturation $B_s$; and
      a magnetic recording layer on the underlayer for enabling the recording of data in magnetized regions along data tracks; and
   a perpendicular recording head comprising
      a magnetic write pole for applying a generally perpendicular magnetic field to the recording layer for magnetizing regions in the data tracks, the write pole having a substantially planar end facing the recording layer and a trailing edge oriented generally orthogonal to the along-the-track direction;
      a trailing shield having a substantially planar end facing the recording layer, a front edge facing the write pole trailing edge and located down-track from the write pole trailing edge, and a throat thickness measured generally orthogonally from the trailing shield's planar end, the trailing shield having a throat thickness and magnetic permeability so as not to be magnetically saturated in the presence of a write field from the write pole and a magnetic saturation $B_s$ greater than the magnetic saturation $B_s$ of the underlayer;
      nonmagnetic gap material between the trailing edge of the write pole and the front edge of the trailing shield to define a write gap; and
      a magnetic return pole for return of write pole magnetic flux from the magnetically permeable underlayer of the recording medium.

2. The system of claim 1 wherein the return pole is connected to the write pole by a yoke and wherein the trailing shield is a floating shield not connected to the return pole or the yoke.

3. The system of claim 1 wherein the return pole is connected to the write pole by a yoke and wherein the trailing shield is connected to one of the return pole and the yoke.

4. The system of claim 1 wherein the trailing shield includes a trailing shield notch having a front edge and a back edge, the front edge of the notch being the trailing shield front edge and having a width in the cross-track direction generally equal to the cross-track width of the write pole trailing edge, the back edge of the notch being substantially wider than the cross-track width of the write pole trailing edge, and wherein the trailing shield throat thickness is the trailing shield notch throat thickness.

5. The system of claim 1 wherein the trailing shield comprises a trailing shield portion of a wrap-around shield having two side shield portions connected to the trailing shield portion.

6. The system of claim 1 wherein the generally perpendicular magnetic field applied to the recording layer is a function of distance along the data track, and wherein when the field is in a positive direction in the recording layer region adjacent the write pole end the field is in a negative direction in the recording layer region adjacent the trailing shield end.

7. The system of claim 1 wherein the magnetic reluctance from the underlayer to the trailing shield is smaller than the magnetic reluctance from the underlayer to the return pole.

8. The system of claim 7 wherein the underlayer is magnetically saturated in a region beneath the trailing gap and the trailing shield is not magnetically saturated.

9. The system of claim 1 wherein the recording medium further comprises an exchange break layer between the underlayer and the recording layer for magnetically decoupling the underlayer and the recording layer.

10. A perpendicular magnetic recording hard disk drive comprising:
    a perpendicular magnetic disk comprising
       a generally planar substrate;
       an underlayer of magnetically permeable material on the substrate; and
       a magnetic recording layer on the underlayer for enabling the recording of data in magnetized regions along data tracks; and
    a perpendicular recording head comprising
       a magnetic write pole for applying a generally perpendicular magnetic field to the recording layer for magnetizing regions in the data tracks, the applied magnetic field being a function of distance along the data track, the write pole having a substantially planar end facing the recording layer and a trailing edge oriented generally orthogonal to the along-the-track direction;
       a trailing shield of magnetically permeable material and having a substantially planar end facing the recording layer, a front edge facing the write pole trailing edge and located down-track from the write pole trailing edge, and a throat thickness measured generally orthogonally from the trailing shield's planar end;
       nonmagnetic gap material between the trailing edge of the write pole and the front edge of the trailing shield to define a write gap; and
       a magnetic return pole for return of write pole magnetic flux from the magnetically permeable underlayer of the recording medium;
    wherein in the presence of a write field from the write pole the magnetic reluctance from the underlayer to the trailing shield is smaller than the magnetic reluctance from the underlayer to the return pole.

11. The disk drive of claim 10 wherein the underlayer has a thickness and magnetic permeability so as to be magnetically saturated in a region adjacent the write gap in the presence of a write field from the write pole, and the trailing shield has a thickness and magnetic permeability so as not to be magnetically saturated in the presence of a write field from the write pole.

12. The disk drive of claim 10 wherein when the write field is in a positive direction in the recording layer region adjacent the write pole end the field is in a negative direction in the recording layer region adjacent the trailing shield end.

13. The disk drive of claim 10 wherein the underlayer has a thickness greater than zero and less than 50 nm, the underlayer being sufficiently thick to provide magnetic permeability $\mu$ to the underlayer of greater than 1 and less than 25.

14. The disk drive of claim 10 wherein the underlayer has a magnetic saturation $B_s$ less than the magnetic saturation $B_s$ of the trailing shield.

15. The disk drive of claim 10 wherein the underlayer is a laminated underlayer formed of at least two magnetically permeable films separated by a nonmagnetic interlayer film.

16. The disk drive of claim 15 wherein the laminated underlayer is an antiferromagnetically-coupled (AF-coupled) underlayer.

17. The disk drive of claim 10 wherein the recording disk further comprises an exchange break layer between the underlayer and the recording layer for magnetically decoupling the underlayer and the recording layer.

18. The disk drive of claim 10 wherein the return pole is connected to the write pole by a yoke and wherein the trailing shield is a floating shield not connected to the return pole or the yoke.

19. The disk drive of claim 10 wherein the return pole is connected to the write pole by a yoke and wherein the trailing shield is connected to one of the return pole and the yoke.

20. The disk drive of claim 10 wherein the trailing shield includes a trailing shield notch having a front edge and a back edge, the front edge of the notch being the trailing shield front edge and having a width in the cross-track direction generally equal to the cross-track width of the write pole trailing edge, the back edge of the notch being substantially wider than the cross-track width of the write pole trailing edge, and wherein the trailing shield throat thickness is the trailing shield notch throat thickness.

21. The disk drive of claim 10 wherein the trailing shield comprises a trailing shield portion of a wrap-around shield having two side shield portions connected to the trailing shield portion.

\* \* \* \* \*